United States Patent
Nieman et al.

(10) Patent No.: US 6,264,566 B1
(45) Date of Patent: Jul. 24, 2001

(54) THRUST WASHER FOR UNIVERSAL JOINT

(75) Inventors: Andrew L. Nieman, Lambertville, MI (US); Leon W. Valencic, Holland, OH (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/475,863

(22) Filed: Dec. 30, 1999

Related U.S. Application Data

(60) Provisional application No. 60/114,595, filed on Dec. 31, 1998.

(51) Int. Cl.[7] .................................................... F16D 3/16
(52) U.S. Cl. ........................ 464/132; 464/903; 384/425; 384/905.1; 384/908
(58) Field of Search ................................. 464/128, 129, 464/130, 132, 136, 903; 384/371, 425, 905.1, 908

(56) References Cited

U.S. PATENT DOCUMENTS

| | | |
|---|---|---|
| 2,078,739 | 4/1937 | Slaght . |
| 2,587,408 | 2/1952 | Trask . |
| 2,757,054 * | 7/1956 | Van De Warker ............... 384/908 X |
| 2,795,444 | 6/1957 | Nenzell . |
| 2,983,534 | 5/1961 | Heller et al. . |
| 2,984,528 * | 5/1961 | Shaffer ................................. 384/425 |
| 2,996,901 | 8/1961 | Kleinschmidt . |
| 3,050,351 | 8/1962 | Kempf . |
| 3,168,321 | 2/1965 | Glicksman . |
| 3,259,404 | 7/1966 | Papenguth . |

(List continued on next page.)

FOREIGN PATENT DOCUMENTS

| | | |
|---|---|---|
| 2616020 | 10/1977 | (DE) . |
| 223753 | 8/1924 | (GB) . |

OTHER PUBLICATIONS

"Permanently Lubricated U–Joints", Rockwell Automotive, Apr. 1996.
Dana Drawing No. 232191, Jan. 16, 1991.

* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A universal joint assembly includes a cross having a plurality of trunnions extending outwardly therefrom. A bearing cup is disposed about each of the trunnions, and a plurality of needle bearings is disposed between each of the bearing cups and its associated trunnion to facilitate relative rotational movement. A thrust washer is disposed between the outer end surface of each of the trunnions and its associated bearing cup. Each of the thrust washers is generally annular in shape, including a first inner annular region surrounded by a second outer annular region. The inner region is sized to extend between the outer end surface of the trunnion and the associated inner surface of the end portion of the bearing cup. The outer region is sized to extend between the outer ends of the needle bearings and the associated inner A surfaces of the end portions of the bearing cup. The outer region is connected to and supported on the inner region by a plurality of radially extending legs. The inner region of the thrust washer is formed from a first material, while the outer region of the thrust washer is formed from a second material that is different from the first material. The inner region is preferably formed from a first material that is suited to withstand the relatively large loading stresses experienced between the trunnion and the bearing cup during use. The second region is preferably formed from a second material that is suited to lubricate the needle bearings during use. It is desirable that the first and second materials be capable of being molded together simultaneously to form the integral thrust washer.

16 Claims, 3 Drawing Sheets

U.S. PATENT DOCUMENTS

| | | |
|---|---|---|
| 3,316,035 | 4/1967 | Zuber . |
| 3,344,689 | 10/1967 | Naumann . |
| 3,399,007 | 8/1968 | Remmers et al. . |
| 3,588,787 | 6/1971 | Kindell et al. . |
| 3,589,143 * | 6/1971 | Batt et al. ............ 464/130 |
| 3,635,535 | 1/1972 | Schultenkamper . |
| 3,674,325 | 7/1972 | Moroney et al. . |
| 3,726,178 | 4/1973 | Dimitry . |
| 4,050,130 | 9/1977 | Pitner . |
| 4,371,357 | 2/1983 | Petrzelka et al. . |
| 4,419,086 | 12/1983 | Condon . |
| 4,448,550 | 5/1984 | Moroney . |
| 4,637,740 | 1/1987 | Olschewski et al. . |
| 4,702,657 | 10/1987 | Jelinek . |
| 4,854,738 | 8/1989 | Linnemier . |
| 4,934,979 | 6/1990 | Gille et al. . |
| 5,106,342 | 4/1992 | Fisher . |
| 5,199,800 * | 4/1993 | Bauer et al. ............ 384/905.1 X |
| 5,286,115 | 2/1994 | Toji et al. . |
| 5,865,678 * | 2/1999 | Koedam et al. ............ 464/128 |
| 6,129,634 * | 10/2000 | Nieman ............ 464/132 |

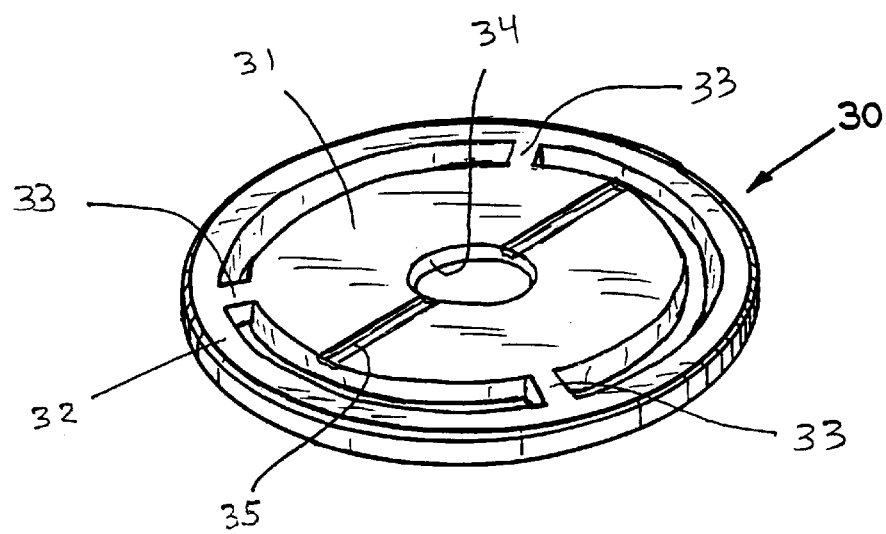
FIG. 3
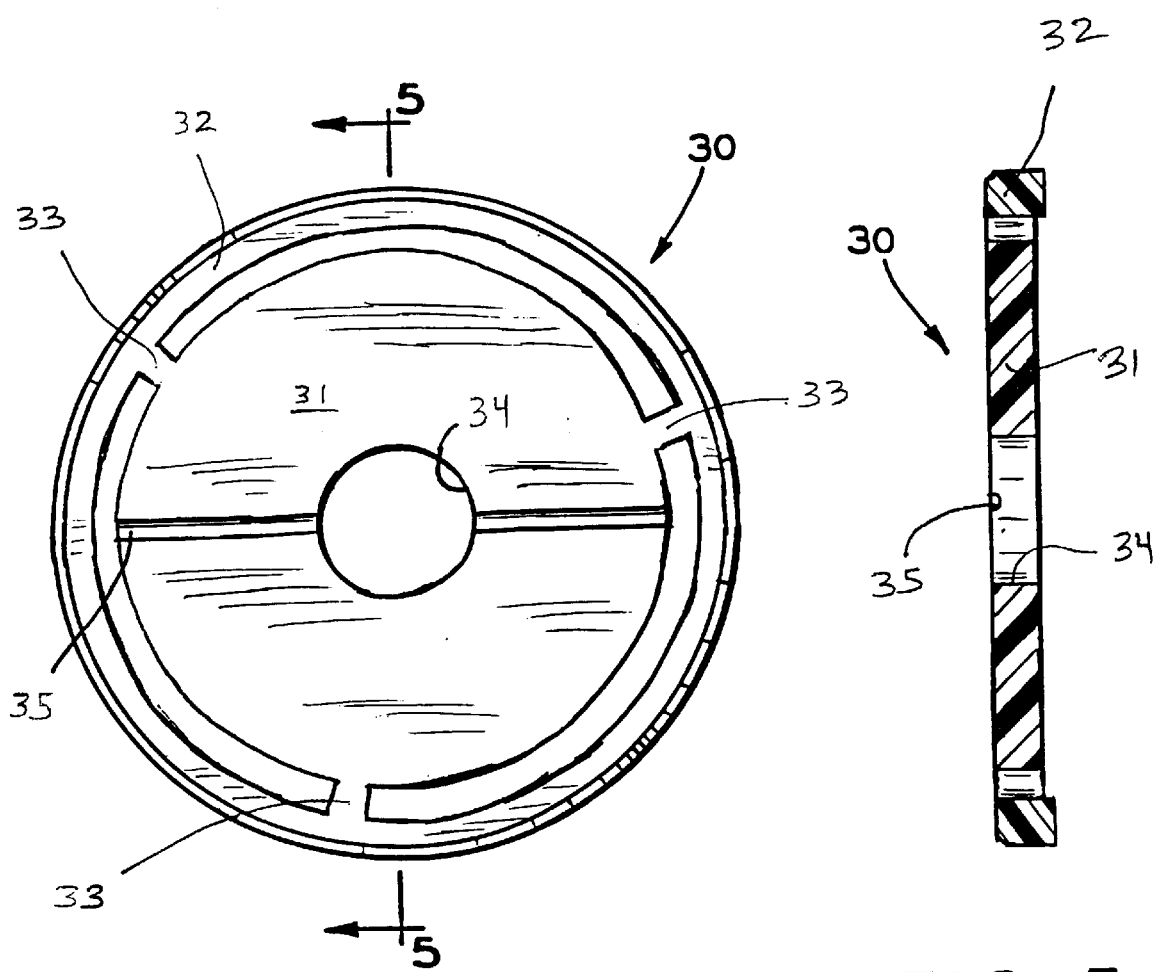
FIG. 4   FIG. 5

THRUST WASHER FOR UNIVERSAL JOINT

CROSS REFERENCE TO RELATED APPLICATION

This application claims the benefit of United States Provisional Application No. 60/114,595, filed Dec. 31, 1998, the disclosure of which is incorporated herein by reference.

BACKGROUND OF THE INVENTION

This invention relates in general to thrust washers that are disposed between the outer ends of trunnions and the inner surfaces of bearing cups in universal joint assemblies. More specifically, this invention relates to an improved structure for such a thrust washer including inner and outer regions that are formed from two different types of materials and that are connected together by one or more legs.

In most land vehicles in use today, a drive train assembly is provided for transmitting rotational power from an output shaft of an transmission to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the transmission and a first end of the driveshaft tube, while a second universal joint is connected between a second end of the driveshaft tube and the input shaft of the axle assembly. The universal joints provide a rotational driving connection from the output shaft of the transmission through the driveshaft tube to the input shaft of the axle assembly, while accommodating a limited amount of angular misalignment between the rotational axes of these three shafts.

A typical universal joint includes a cross having a central body portion with four cylindrical trunnions extending outwardly therefrom. The trunnions are oriented in a single plane and extend at right angles relative to one another. A hollow cylindrical bearing cup having a cylindrical outside wall and a circular end wall is mounted on the end of each of the trunnions. A bearing structure, such as a plurality of needle bearings or roller bearings, is provided between the trunnion and the associated bearing cup to facilitate relative rotational movement therebetween. The bearing cups that are mounted on a first opposed pair of the trunnions can be connected to a first yoke secured to a first component of the drive train assembly, while the bearing cups mounted on a second opposed pair of the trunnions can be connected to a second yoke secured to a second component of the drive shaft assembly.

When the bearing cups are mounted on the associated trunnions, the circular end walls of the bearing cups are disposed adjacent to the axially outer ends of the trunnions and bearings. If the inner surfaces of these end walls directly contact the axially outer end surfaces of the trunnions during operation, friction caused by such direct contact can generate undesirable heat and wear. However, if the inner end surfaces of the bearing cups do not fit snugly against the axially outer end surfaces of the trunnions, relative axial movement between the bearing cups and the trunnions can cause imbalances and result in undesirable noise and vibrations. Thus, to address these situations, it is known to position a thrust washer between the inner end surface of the bearing cup and the axially outer end surface of the trunnion. A typical thrust washer is formed from a relatively low friction, wear resistant material, such as plastic, that can absorb the thrust loads that occur between the end of the trunnion and the bearing cap and take up any looseness therebetween. A typical thrust washer also extends radially outwardly into the annular space between the axially outer ends of the bearings and the end wall of the bearing cup to properly position such bearings relative to the bearing cup during operation.

In the past, such thrust washers have been manufactured from a single annular piece of material having a first inner portion that extended between the axially outer end of the trunnion and the end wall of the bearing cup and a second outer portion that extended between the axially outer ends of the bearings and the end wall of the bearing cup. This structure performs well for most applications of universal joint assemblies. However, problems can occur when universal joint assemblies having unitary thrust washers are used in high speed, high angle, and low torque applications. In these situations, the trunnion may become angled relative to the bearing cup and apply uneven pressure against the first portion of the thrust washer. When this occurs, one side of the first portion of the thrust washer is forced against the bearing cup, while the other side moves away from the bearing cup. Because the first and second portions of the thrust washer are formed as a single piece of material, the corresponding side of the second portion of the thrust washer also moves away from the bearing cup. When the ends of the needle bearings engage this side of the thrust washer, the thrust washer is subjected to significant wear and may eventually break apart.

In these situations, it would be desirable to form the first and second portions of the thrust washer as separate members. At the same time, because the first and second portions of the thrust washers are intended to address different aspects of operation of the universal joint, it would be desirable to form the first and second portions of the thrust washers from two different materials. However, the use of two separate thrust washer portions creates increased difficulty in manufacturing the universal joint, both in the increased number of parts that must be handled during assembly and in the increased likelihood that one or both of the thrust washer portions may become dislodged or otherwise improperly positioned during assembly. Thus, it would be desirable to provide an improved structure for a thrust washer for use in a universal joint assembly that addresses these concerns.

SUMMARY OF THE INVENTION

This invention relates to an improved structure for a thrust washer for use in a universal joint assembly. The universal joint assembly includes a cross having a plurality of trunnions extending outwardly therefrom. A bearing cup is disposed about each of the trunnions, and a plurality of needle bearings is disposed between each of the bearing cups and its associated trunnion to facilitate relative rotational movement. A thrust washer is disposed between the outer end surface of each of the trunnions and its associated bearing cup. Each of the thrust washers is generally annular in shape, including a first inner annular region surrounded by a second outer annular region. The inner region is sized to extend between the outer end surface of the trunnion and the associated inner surface of the end portion of the bearing cup. The outer region is sized to extend between the outer ends of the needle bearings and the associated inner surfaces of the end portions of the bearing cup. The outer region is connected to and supported on the inner region by a plurality of radially extending legs. The inner region of the thrust washer is formed from a first material, while the outer region of the thrust washer is formed from a second material that is different from the first material. The inner region is preferably formed from a first material that is suited to withstand the relatively large loading stresses experienced between the trunnion and the bearing cup during use. The second region is preferably formed from a second material that is suited to lubricate the needle bearings during use. The first and second regions can be molded together simultaneously to form the integral thrust washer.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a perspective view of the thrust washer illustrated in FIGS. 1 and 2.

FIG. 4 is a top plan view of the thrust washer illustrated in FIG. 3.

FIG. 5 is a sectional elevational view of the thrust washer taken along line 5—5 of FIG. 4.

DETAILED DESCRIPTION OF THE PREFERRED EMBODIMENT

Figure 1:
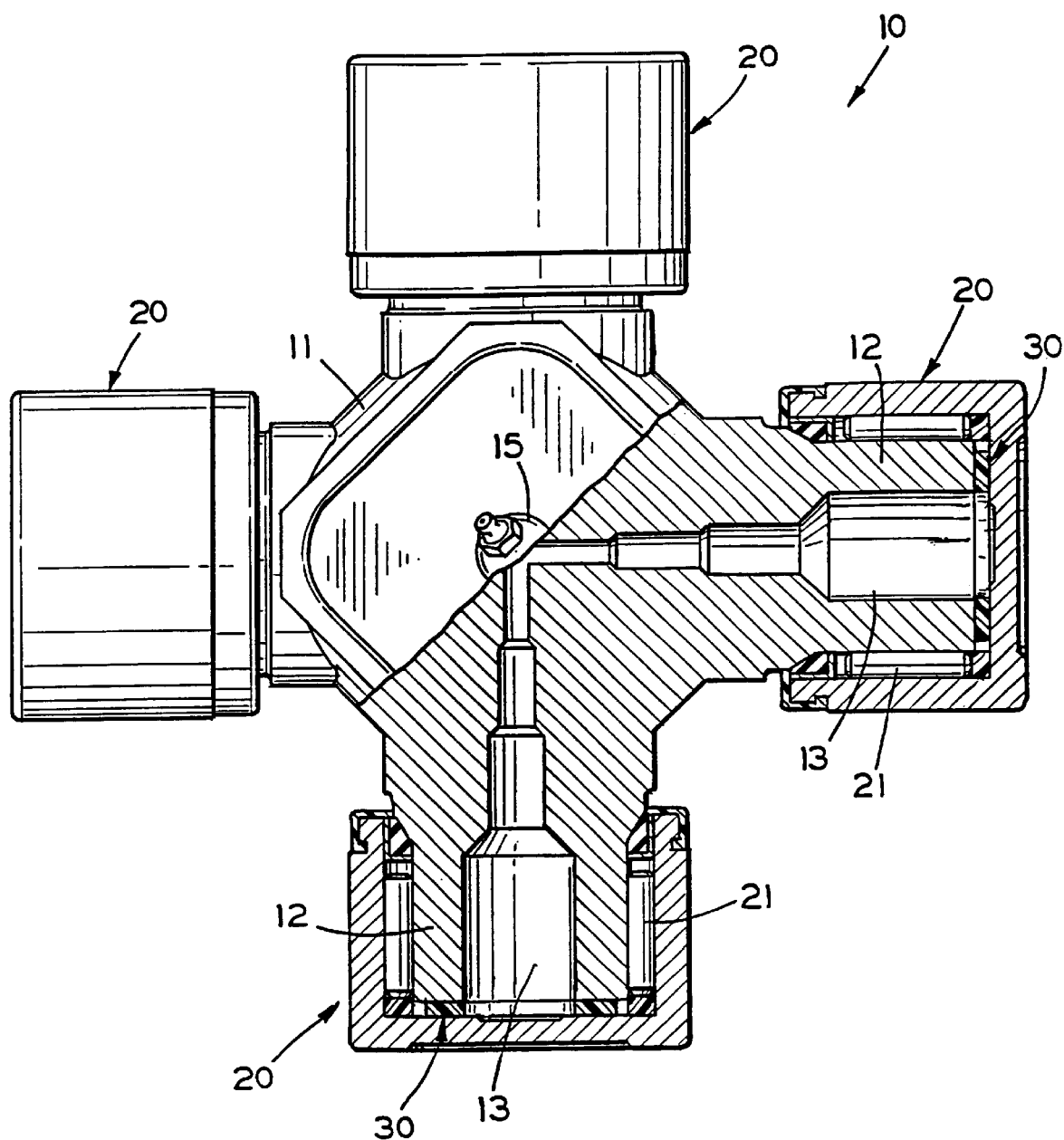
FIG. 1 is an elevational view, partially in cross section, of a cross for a universal joint assembly including an improved structure for a thrust washer in accordance with this invention.
Figure 2:
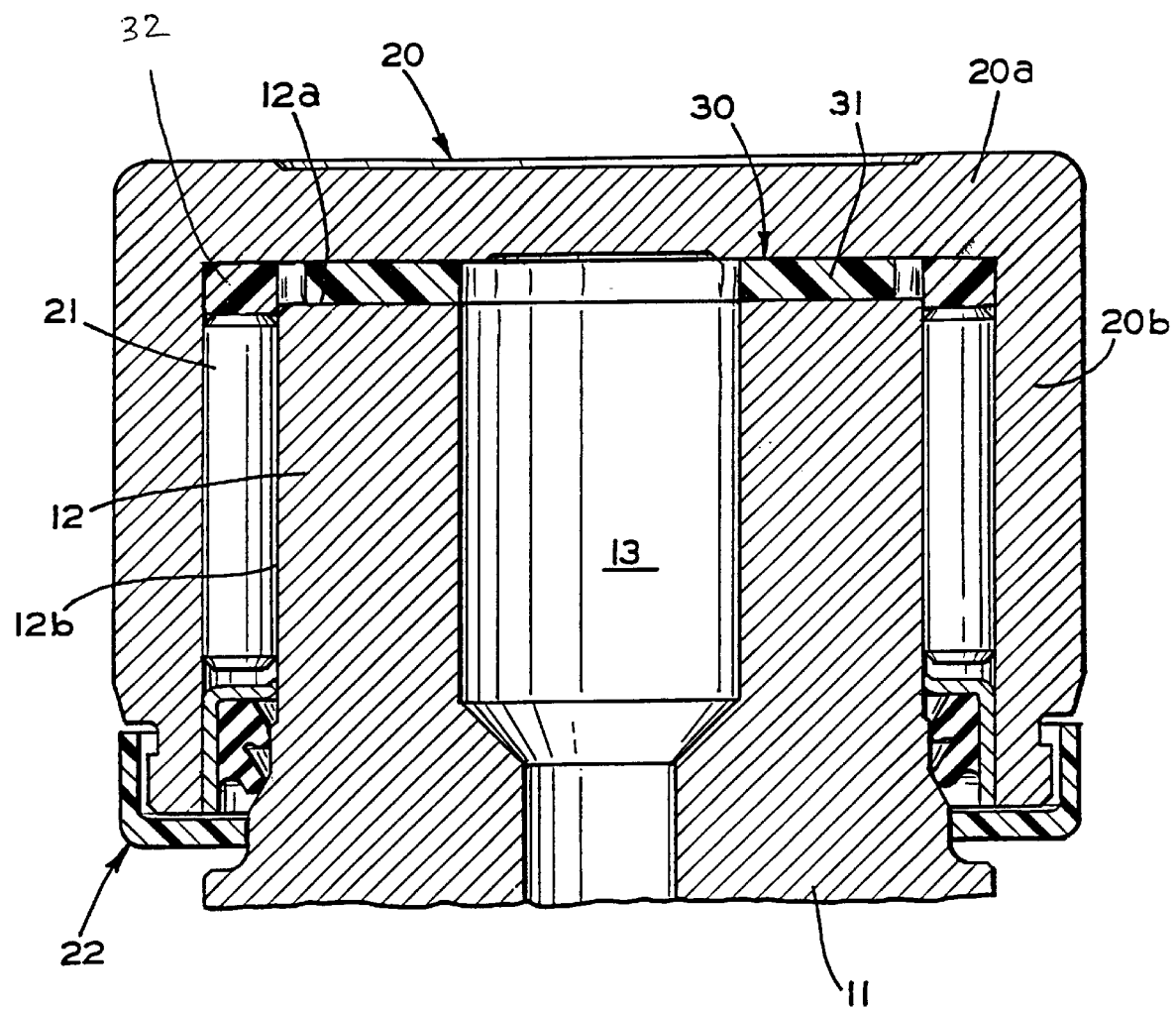
FIG. 2 is an enlarged sectional elevational view of a portion of one of the trunnions illustrated in FIG. 1, together with thrust washer of this invention and other associated components.

Referring now to the drawings, there is illustrated in FIGS. 1 and 2 a cross, indicated generally at 10, for a universal joint assembly in accordance with this invention. As is well known in the art, the cross 10 can form a portion of a universal joint assembly, together with a pair of yokes (not shown) or similar structures connected to respective torque transmitting shafts (not shown), both of which are conventional in the art. For example, each opposing pair of the trunnions 12 (i.e. trunnions that are located 180° apart from each other) can be retained within recesses or apertures formed in corresponding pairs of opposed arms of each of the yokes by any suitable fastening device (not shown). Suitable fastening devices include, but are not limited to, snap rings, injected molded plastic rings, U-bolts, or bolted plates that engage each bearing cup 20 and its associated yoke to fix each pair of opposing trunnions 12 in place within its associated yoke arms.

The illustrated cross 10 includes a central body portion 11 having a plurality of trunnions 12 extending outwardly therefrom. In the illustrated embodiment, four of such trunnions 12 are formed integrally with the body portion 11. The trunnions 12 are disposed at right angles relative to one another and are oriented so as to lie in a single plane. Each of the illustrated trunnions 12 is generally cylindrical in shape, having an axially outermost end surface 12a and a cylindrical bearing surface 12b. However, the trunnions 12 may be formed having any desired shape or configuration and need not be formed integrally with the central body portion 11.

An internal passageway 13 is formed in each of the illustrated trunnions 12. Each of the internal passageways 13 extends outwardly from a central cavity formed in the central body portion 11 of the cross member 10 through to the outer end surface 12b thereof. A fitting 15 may be provided in an aperture (not shown) formed in the central body portion 11 of the cross 10 to provide fluid communication with the central cavity thereof. The fitting 15 can be used to supply lubricant through the central cavity and into the passageways 13 of the trunnions 12 for a purpose that will be explained below. The trunnions 12 may be formed having no such internal passageways 13 if desired.

A bearing cup, indicated generally at 20, is disposed about the end portion of each of the trunnions 12. Each of the bearing cups 20 includes an outer end portion 20a having a hollow cylindrical skirt portion 20b extending therefrom. When installed on the trunnion 12, an inner surface of the outer end portion 20a of the bearing cup 20 is disposed adjacent to the outer end surface 12a of the trunnion 12, while the hollow cylindrical skirt portion 20b of the bearing cup 20 is disposed about the cylindrical bearing surface 12b of the trunnion 12. A plurality of needle bearings 21 or other bearing structure is disposed between the inner surface of the hollow cylindrical skirt portion 20b of the bearing cup 20 and the cylindrical bearing surface 12b of the trunnion 12. Also, a conventional seal and dust guard assembly, indicated generally at 22, may (if desired) be provided about the open end of each bearing cup 20.

As mentioned above, the fitting 15 can be used to supply lubricant through the central cavity and into the passageways 13 of the trunnions 12. When so supplied, lubricant flows radially outwardly through each of the passageways 13, laterally between the outer end surfaces 12a of the trunnions 12 and the inner surfaces of the associated outer end portions 20a of the bearing cups 20, and radially inwardly into the regions of the needle bearings 21. As a result, lubricant can be supplied to the needle bearings 21 to facilitate rotational movement of the bearing cups 20 relative to the associated trunnions 12. Although the illustrated lubricant fitting 15 communicates 20 with the central cavity of the central body portion 11 of the cross 10, the lubricant fitting 15 may be located at any desired location on the cross 10.

A thrust washer, indicated generally at 30, is disposed between the outer end surface 12a of at least one (and preferably all) of the trunnions 12 and the associated inner surfaces of the end portions 20a of the bearing cups 20. The structure of one of the thrust washers 30 is illustrated in detail in FIGS. 3 through 5. As shown therein, the thrust washer 30 is generally flat and annular in shape, including a first inner annular region 31 surrounded by a second outer annular region 32. The inner region 31 is preferably sized to extend between the outer end surface 12a of the trunnion 12 and the associated inner surface of the end portion 20a of the bearing cup 20. The outer region 32 is preferably sized to extend between the outer ends of the needle bearings 21 and the associated inner surfaces of the end portions 20a of the bearing cup 20.

The outer region 32 is connected to and supported on the inner region 31 by one or more radially extending legs 33. In the illustrated embodiment, three equidistantly spaced legs 33 are provided between the inner region 31 and the outer region 32. However, it will be appreciated that any number of such legs 33 may be provided. The legs 33 are formed integrally with the inner and outer regions 31 and 32. Thus, during the manufacture of the cross 10 of the universal joint assembly, the inner and outer regions 31 and 32 are installed as a unit with the unitary thrust washer. Following such installation and the subsequently assembly of the cross, it may be desirable for the inner and outer regions 31 and 32 to be free to move relative to one another. To accomplish this, the legs 33 may be designed so as to fracture after installation and operation of the universal joint assembly in a vehicular drive train system. Such fracture would allow the inner region 31 and the outer region 32 to move relative to each other as separate pieces.

The inner region 31 of the thrust washer 30 is formed from a first material, while the outer region 32 of the thrust washer 30 is formed from a second material that is different from the first material. This is because the first region of the thrust washer functions as a thrust surface between the axially outer end 12a of the trunnion 12 and the end wall 20a of the bearing cup 20. The outer region 32 of the thrust washer 30, on the other hand, functions as a positioning and lubricating mechanism between the axially outer ends of the needle bearings 21 and the end wall 20a of the bearing cup 20. Therefore, the inner region 31 of the thrust washer 30 is preferably formed from a first material that is suited to withstand the relatively large loading stresses experienced between the trunnion and the bearing cup during use. For example, the first material may be a resilient, deformable, elastic material, such as plastic or rubber, that is capable of being molded for ease of manufacturing. Suitable materials can include, but are not limited to, nylons, nylon-based materials, or a glass-filled nylon composite. The second region 32 of the thrust washer 32 may also, for example, be formed from nylons or nylon-based materials, such as nylatron GS51-13. The second region 32 of the thrust washer 30 may be formed from a second material that is suited to lubricate the needle bearings during use. For example, the second material may be a material that will facilitate free rotation of the needle bearings 21 during operation. Suitable materials can include, but are not limited to, lubricating plastics, such as any of the fluorocarbon polymers (particularly polytetrafluoroethylene). It is desirable that the first and second materials be capable of being molded together simultaneously to form the integral thrust washer 30.

The legs 33 may be formed from either or both of the materials used to form the inner and outer regions 31 and 32. Alternatively, the legs 33 may be formed from a third material. The third material can be selected to be relatively brittle or otherwise adapted to facilitate the fracturing of the inner and outer regions 31 and 32 from one another, as described above.

A central opening 34 may be formed through the center of the inner region 31 of the thrust washer 30. Preferably, the central opening 34 corresponds approximately in size with the size of the lubricant passageway 13, although such is not necessary. One or more grooves 35 may be formed in one or both sides of the thrust washer 30. The grooves 35 may be provided to facilitate the flow of lubricant from the passageway 13 to the region of the needle bearings 21.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A thrust washer for use in a universal joint cross comprising:

a first inner region formed from a first material;

a second outer region surrounding and spaced apart from said first inner region, said second outer region being formed from a second material that is different from said first material; and at least one leg integrally connecting said first region with said second region.

2. The thrust washer defined in claim 1 wherein said first material is a resilient, deformable, elastic material.

3. The thrust washer defined in claim 2 wherein said first material is a plastic or rubber material that is capable of being molded.

4. The thrust washer defined in claim 3 wherein said first material is a nylon material, a nylon-based material, or a glass-filled nylon composite.

5. The thrust washer defined in claim 1 wherein said second material is a lubricating plastic material.

6. The thrust washer defined in claim 5 wherein said second material is a fluorocarbon polymer material.

7. The thrust washer defined in claim 1 wherein a plurality of legs connect said first region with said second region.

8. The thrust washer defined in claim 7 wherein each of said legs is molded integrally with said inner and outer regions.

9. A universal joint cross comprising:

a body portion having a trunnion extending outwardly therefrom;

a bearing cup rotatably mounted on said trunnion; and a thrust washer disposed between said bearing cup and said trunnion, said thrust washer including a first inner region formed from a first material, a second outer region surrounding and spaced apart from said first inner region, said second outer region being formed from a second material that is different from said first material, and at least one leg integrally connecting said first region with said second region.

10. The thrust washer defined in claim 9 wherein said first material is a resilient, deformable, elastic material.

11. The thrust washer defined in claim 10 wherein said first material is a plastic or rubber material that is capable of being molded.

12. The thrust washer defined in claim 11 wherein said first material is a nylon material, a nylon-based material, or a glass-filled nylon composite.

13. The thrust washer defined in claim 9 wherein said second material is a lubricating plastic material.

14. The thrust washer defined in claim 13 wherein said second material is a fluorocarbon polymer material.

15. The thrust washer defined in claim 9 wherein a plurality of legs connect said first region with said second region.

16. The thrust washer defined in claim 15 wherein each of said legs is molded integrally with said inner and outer regions.

* * * * *